Figure 1:
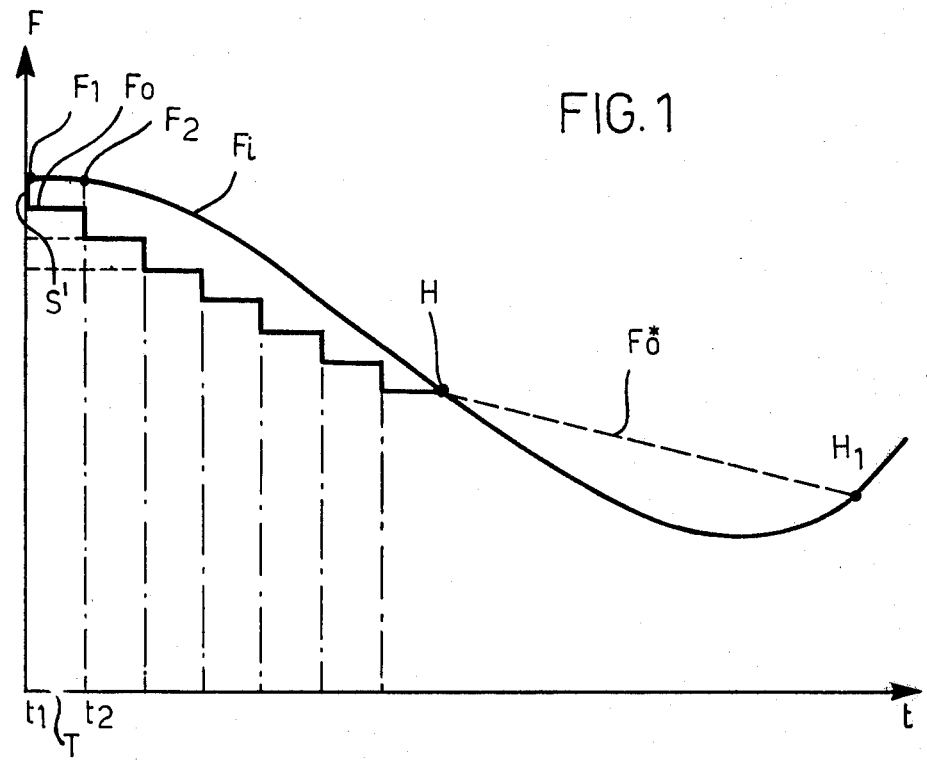

United States Patent [19]

Bernabo' et al.

[11] 3,998,496
[45] Dec. 21, 1976

[54] METHOD AND APPARATUS FOR THE ANTISKID BRAKING OF A VEHICLE

[75] Inventors: PierLuigi Bernabo', Turin; Oscar Blazic, Sant'Ambrogio (Turin), both of Italy

[73] Assignee: Fiat Societa Per Azioni, Turin, Italy

[22] Filed: Sept. 9, 1975

[21] Appl. No.: 611,732

[30] Foreign Application Priority Data

Sept. 17, 1974 Italy .................. 69805/74

[52] U.S. Cl. .................. 303/106; 303/20
[51] Int. Cl.² .................. B60T 8/02; B60T 8/08
[58] Field of Search ........ 303/21 BE, 21 P, 21 CG, 303/21 CF, 20, 95, 97, 104, 106

[56] References Cited
UNITED STATES PATENTS

| | | | |
|---|---|---|---|
| 3,790,227 | 2/1974 | Dozier | 303/21 BE |
| 3,827,760 | 8/1974 | Fleagle | 303/21 P |

Primary Examiner—George E. A. Halvosa
Assistant Examiner—Reinhard J. Eisenzopf
Attorney, Agent, or Firm—Sughrue, Rothwell, Mion, Zinn & Macpeak

[57] ABSTRACT

A method and apparatus for the antiskid braking of a vehicle, of the type in which the signals representing the speed of two wheels of an axle of the vehicle are generated and used, together with a signal representing the deceleration of the vehicle to generate control signals for successive release and reapplication of the brakes during a braking operation, in which a signal representing the slowest wheel of the axle is compared with a reference signal generated cyclically from the said speed and deceleration signals in successive intervals of time using the expression $$F_o = \frac{1 - B \cdot (A + C d_v) T_1}{T_1}$$

where A, B and C are predetermined constants, $d_v$ is the deceleration signal and $T_1$ is the reciprocal of the signal representing the speed of the slowest wheel of the axle.

2 Claims, 2 Drawing Figures

METHOD AND APPARATUS FOR THE ANTISKID BRAKING OF A VEHICLE

The present invention relates to a method and apparatus for the antiskid braking of a vehicle, particularly a motor vehicle, of the type in which during a braking operation there are alternate "brake application" stages when the brakes are applied and "brakes released" stages when the brakes are released, commutation between these two stages being controlled in dependence on signals representing the dynamic state of the two wheels of an axle of the vehicle, and the deceleration of the vehicle, in which at the end of each brake application stage, the brakes of the two wheels of the axle are released when the slower wheel of the two exceeds a certain threshold of deceleration, and at the end of each "brakes released" stage the brakes are reapplied when the speed of the slower wheel of the said axle reaches a certain threshold speed, this threshold speed being determined by a reference signal which has an initial value which is dependent on the speed of the slower wheel of this axle at the moment when the brakes are released, and which decreases linearly, with a slope proportional to the deceleration of the vehicle at the moment when the brakes are released.

Antiskid braking systems of this type will be referred to hereinafter as "systems of the type described" The term "axle" will be understood herein to refer to at least a pair of wheels located side by side one on each side of a vehicle, but not necessarily interconnected by an axle shaft.

The object of this invention is to provide an antiskid braking system of the type described, which is particularly suitable for control by means of digital techniques and in which the errors caused by the processing circuits are less than the corresponding errors in known such systems.

According to the present invention, there is provided a method for the antiskid braking of a vehicle, of the type in which during a braking operation there are alternate "brake application" stages when the brakes are applied and "brakes released" stages when the brakes are released, commutation between these two stages being controlled in dependence on signals representing the dynamic state of the two wheels of an axle of the vehicle, and the deceleration of the vehicle, in which at the end of each brake application stage, the brakes of the two wheels of the axle are released when the slower wheel of the two exceeds a certain threshold of deceleration, and at the end of each "brakes released" stage the brakes are reapplied when the speed of the slower wheel of the said axle reaches a certain threshold speed, this threshold speed being determined by a reference signal which has an initial value which is dependent on the speed of the slower wheel of this axle at the moment when the brakes are released, and which decreases linearly, with a slope proportional to the deceleration of the vehicle at the moment when the brakes are released, comprising performing, in successive cycles of operation of equal predetermined duration, the steps of:

generating a reference signal dependent on the speed of the slowest wheel of the axle and deceleration of the vehicle, the reference signal being given by the relation $$F_0 = \frac{1 - B - (A + C d_v) T_1}{T_1}$$

where A, B and C are predetermined constants; $d_v$ is a signal representative of the deceleration of the vehicle; $T_1$ is a signal dependent on the speed of the slowest wheel of the axle at the initial moment of the cycle;

comparing the reference signal with a signal representing the instantaneous speed of the slower wheel of the axle, and if the latter signal becomes less than or equal to the reference signal stopping the said cyclic processing and releasing the brakes of the two wheels of the axle to start the subsequent brakes released stage of operation.

One of the basic advantages of this method is that an actual signal, that is a signal derived directly from a sensor of a physical quantity, is compared with a processed signal, thus reducing the possibility of errors in processing.

According to another aspect of the invention, a control device for an antiskid braking system for the two wheels of an axle of the vehicle, comprises:

a. a decelerometer operable to produce a signal representative to the deceleration of the vehicle;

b. a clock pulse generator operable to produce a clock pulse signal;

c. an arrangement comprising two sensors operable to produce respective signals representative of the instantaneous speeds of the two wheels of the axle and a first comparator which is operable to compare the two signals from the sensors and produce a signal representative of the instantaneous speed of the slower wheel of the axle;

d. a counter which is fed with the signal from the clock pulse generator and the signal from the first comparator and counts the clock pulses synchronised by the latter signal to produce an output signal given by:

$$N_1 = F_c T_1$$

where $T_1$ is a signal proportional to the inverse of the signal $F_1$ representing the speed of the slower wheel of the axle at the initial moment of the counting cycle; the counter also counting the clock pulses for a predetermined time, after which it clears, the said counting being repeated cyclically;

e. a first memory circuit fed with the signal from the counter and with the signal from the comparator and operable to store the instantaneous signal provided by the counter on the subsequent impulse from the comparator;

f. a second, read only, memory circuit controlled by the first memory circuit and by the signal from the decelerometer, the said second memory circuit being operable to produce an output signal from the form:

$$M = [1 - B - (A + Cd_r) N_1/F_c] K$$

where A, B, C and K are predetermined constants;

g. a multiplier operable to multiply the output signal from the second memory circuit by the factor $$\frac{F_c}{K}$$

thus generating a signal:

$$F_m = \frac{M F_c}{K};$$

h. a divider circuit operable to divide the output signal from the multiplier by the signal from the first memory thus generating a reference signal:

$$F_0 = \frac{M}{KT_1};$$

i. a second comparator comparing cyclically, during successive intervals of time, the reference signal from the divider with the output signal from the first comparator representing the instantaneous speed of the slower wheel of the axle; the said comparator activating a brake release device of the two wheels of the axle if the value of the signal representing the instantaneous speed of the slower wheel of the axle falls below the value of the reference signal, and j. means for generating a second reference signal which decreases linearly with a slope proportional to the deceleration of the vehicle, and has an initial value dependent on the value of the speed of the vehicle at the moment when the brakes were released; the said second reference signal being fed to the said comparator which controls reapplication of the brakes when the second reference signal becomes equal to or less than the signal repesenting the instantaneous speed of the slower wheel of the axle.

Figure 2:
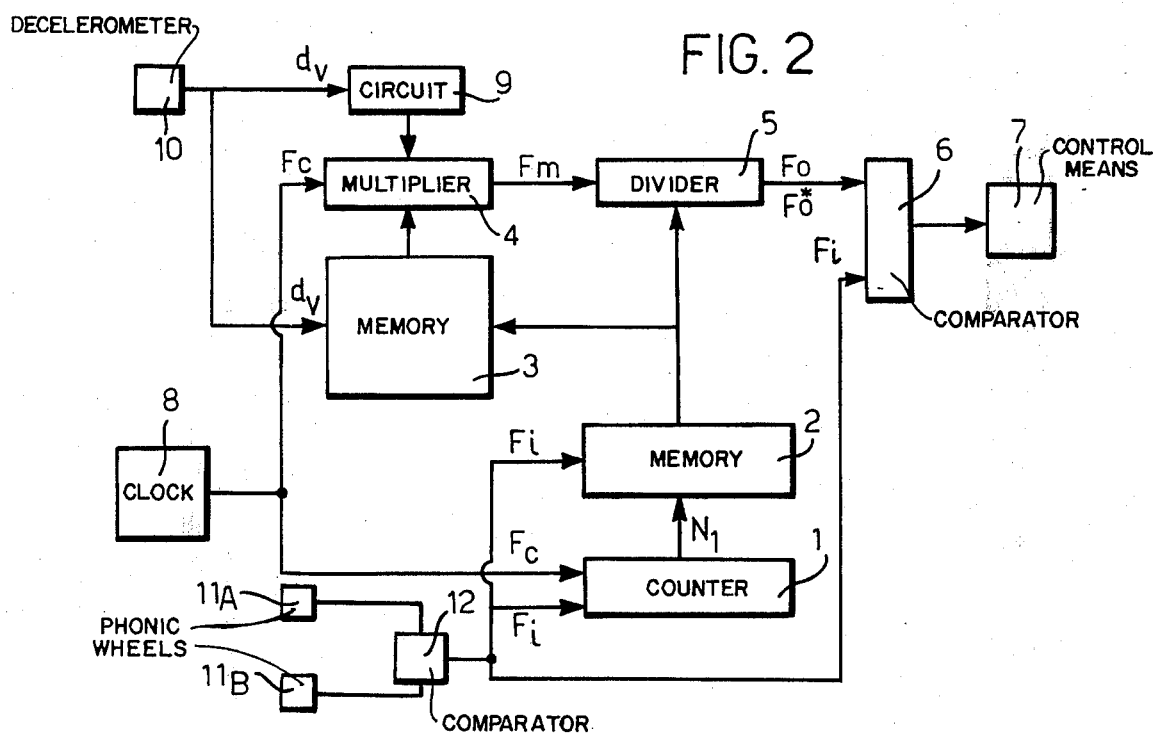

This invention will now be described, purely by way of non-restrictive example, with reference to the accompanying drawings, in which:

FIG. 1 is a schematic diagram illustrating the operating principle of the method of the invention; and FIG. 2 is a block diagram of a practical arrangement for performing the invention.

The method of the invention is based upon the following considerations:

The speed of each wheel of a vehicle to which the antiskid braking system is fitted, is detected by means of a sensor comprising, for example, a phonic wheel keyed onto the wheel of the vehicle and cooperating with an electromagnetic detector. The output signal from each sensor is a signal of the sinusoidal type having a frequency $f_i$ at any time $t_i$ expressed by the relation:

$$F_i = Kv \text{ (Hz)} \quad \text{i}$$

where K is a constant dependent upon the type of sensor used, and $v$ is the speed in Km/h of the wheel.

Deceleration of the wheel in terms of frequency of the phonic wheel using the relation (1) is given by:

$$d_z = \frac{F_1 - F_2}{T} K_1 \; [- \text{m/sec}^2] \quad (2)$$

where T is a predetermined period of time, $F_1$ is the frequency of the sensor output signal at the moment of time $t_1$; $F_2$ the frequency of the sensor output signal at the moment of time $t_2 = t_1 + T$ (FIG. 1); and $K_1$ is a constant dependent upon the type of sensor used and upon the normalisation factors.

The device has to operate to release the brakes of the wheel when the following condition occurs:

$$d_z \geq S \quad 3.$$

where S is the deceleration threshold at which skidding becomes likely and thus at which the brakes should be released.

From the combination of the equations (2) and (3) the following relation can be derived:

$$F_2 \leq F_1 - S^1 \quad 4.$$

where $S^1 = K_2 ST$ and $K_2$ is a constant dependent upon the type of sensor and the normalisation factors.

If the deceleration threshold S is considered as dependent upon the initial velocity of the wheel and the deceleration of the vehicle, one can write:

$$S^1 = A + BF_1 + Cd_v \quad (5)$$

where A, B and C are predetermined constants and $d_v$ is the deceleration of the vehicle.

In a braking system for a 10 ton truck the following values of the above mentioned constants have been successfully used:

A = 5
B = 8 × 10$^{-3}$
C = 16.

The equation (4) thus becomes:

$$F_2 \leq F_1 - (A + BF_1 + Cd_v) \quad (6)$$

By expressing $F_1$ in terms of the period T as $$F_1 = \frac{1}{T_1}$$

it can be seen that braking of the wheel has to occur when the frequency $F_2$ of the phonic wheel falls below a frequency $F_0$ given by the equation:

$$F_0 = \frac{1 - B - (A + Cd_v) T_1}{T_1} \quad (7)$$

where $T_1$ is $$\frac{1}{F_1}.$$

The method of this invention applied to the control of the brakes of the two wheels of an axle of a vehicle thus comprises the operations of measuring at the moment of time $t_1$ the frequency $F_1$ emitted by the sensor which detects the speed of the slower wheel of this axle; generating the frequency $F_0$ which is related to the frequency $F_1$ by equation (7), and comparing instant by instant throughout the whole period $T_1$ the frequency $F_0$ with the signal $F_1$ from the sensor.

If during the time period T the condition:

$$F_i \leq F_o$$

does not occur, then the entire processing cycle starts again using the values of $F_i$ and hence of $F_o$ appropriate to the subsequent time period T.

If, in any time period, the condition of equation (8) occurs (as shown at point H of the graph in FIG. 1) then release of the brakes of the two wheels under consideration takes place.

In FIG. 2 there is shown a block diagram of a device for performing the method of the invention to obtain antiskid braking of a motor vehicle wheel.

A counter 1 receives the signals $F_c$ and $F_i$ respectively coming from a clock 8 and from a comparator 12. The comparator 12 receives two speed signals from two phonic wheels 11a, and 11b keyed on to the two wheels of the axle under consideration, selects the signal representing the slower wheel, and provides a signal $F_i$ dependent on this signal, the signal $F_i$ having a time period $T_1$. The output of the counter 1 is connected to a memory 2 which in its turn feeds a read only memory 3 and a divider 5. The memory 2 is also fed with the signal $F_i$ from the comparator 12.

To the read only memory 3 there is also fed the signal $d_v$ generated by a decelermeter 10 which detects the instantaneous deceleration of the vehicle.

The output of the read only memory 3 is passed to a multiplier 4 to which there is also fed the signal $F_c$ emitted from the clock 8. Also arriving at the multiplier 4 are signals emitted by a circuit 9 for recommencing braking, operation of this circuit being governed by the deceleration detector 10.

The output signal $F_m$ from the multiplier 4 is fed to the divider 5 which generates as an output signal the reference signal $F_0$.

The reference signal $F_0$ and the signal $F_i$ are fed to the input of a comparator 6 which controls means 7 for effecting release of the brakes of the two wheels of the axle.

Operation of the device described above is as follows.

The counter 1 counts the clock pulses at the frequency $F_c$ and produces an output signal synchronised by the signal $F_i$ representing the number of clock pulses counted in the time interval between the first two successive pulses of the signal $F_i$. Thus the output from the counter 1 is given by $$N_1 = F_c T_1$$

The memory 2 memorises the value of the output signal $N_1$ of the counter 1 on the occurrence of the second pulse of the signal $F_i$ during a counting interval T in which T is the time of the processing cycle. The counter 1 continues to count the clock pulses up to the value $$N_T = F_c T$$

after which the counter clears, and is ready to start a new cycle.

The signal $N_1$ is stored in the memory 2 for the duration T of the counting cycle and at the same time sent as an "address" into the read only memory 3.

The "words" of the memory 3 represent the expression:

$$M = [1 - B - (A + Cd_v) N_1/F_c ] K$$

where K is a predetermined constant and B, A and C are the constants of the equation (5). The memory 3 thus makes a correspondence between the values $N_1$ and M. A signal representing the quantity M is passed to the multiplier 4 which multiplies it by the value $F_c/K$. The output signal from the multiplier 4, that is $$F_m = \frac{MF_c}{K}$$

is divided in the divider 5 by the signal $N_1$ thus giving the output signal:

$$F_0 = \frac{M}{KT_1}$$

The comparator 6 compares the signal $F_0$ with the instantaneous speed signal of the vehicle $F_i$, and if $F_i$ becomes less than or equal to $F_0$ at any time the brake release system is energized.

Supposing, for example, that after a certain number of cycles this condition of the wheel occurs, as illustrated at point H on the graph (FIG. 1), the brakes of the two wheels of the axle are released at this point, and the circuit 9 operates to determine when braking shall recommence.

The circuit 9 controls the multiplier 4 in such a way as to supply a second reference signal $F_0^*$ which is fed to the input of the comparator 6 after the signal $F_i$ has fallen below the signal $F_0$. The signal $F_0^*$ decreases linearly with a slope proportional to the deceleration of the vehicle at the moment corresponding to point H and from an inital value proportional to the value of the speed of the slower wheel at the moment corresponding to point H.

When the reference signal $F_0^*$ becomes equal to or less than the instantaneous speed signal $F_0$ of the slower wheel of the axle, the comparator 6 controls the circuit 7 so as to recommence the braking operation: this is shown at point $H_1$ of the graph in FIG. 1.

We claim:

1. A method for the antiskid braking of a vehicle, by sensing the dynamic state of at least two wheels of at least one axle of the vehicle, of the type in which during a braking operation there are alternate "brake application" stages when the vehicle brakes are applied and "brakes released" stages when the vehicle brakes are released, commutation between these two stages being controlled in dependence on signals representing the speed of said at least two wheels of said at least one axle of the vehicle, and on a signal $d_v$ representing the deceleration of said vehicle, wherein at the end of each brake application stage, the brakes of said two wheels of said axle are released when the slower wheel of the two exceeds a certain threshold of deceleration, and at the end of each "brakes released" stage the brakes are reapplied when the speed of the slower wheel of said axle reaches a certain threshold speed, this threshold speed being determined by a reference signal which has an initial value which is dependent on the speed of the slower wheel of this axle at the moment when the brakes are released, and which decreases linearly, with a slope proportional to the deceleration of the vehicle at the moment when the brakes are released, and wherein the method comprises performing, in successive cycles of operation of equal predetermined duration T, the steps of:

generating a reference signal $F_0$ dependent on the speed of the slowest wheel of the axle and on the deceleration of said vehicle, said reference signal being given by the relation:

$$F_0 = \frac{1 - B - (A + C d_v) T_1}{T_1}$$

where A, B and C are predetermined constants; $d_v$ is the signal representative of the deceleration of said vehicle and $T_1$ is a signal representative of the speed of the slowest wheel of the axle at the initial moment of the cycle;

producing a signal $F_i$ representing the instantaneous speed of the slower wheel of said axle;

comparing said reference signal $F_0$ with said signal $F_i$ representing the instantaneous speed of said slower wheel of said axle, and if the latter signal $F_i$ becomes less than or equal to said reference signal $F_0$, stopping said cyclic processing and releasing the brakes of said two wheels of said axle to start the subsequent brakes released stage of operation.

2. A control device for an antiskid braking system for the two wheels of an axle of a vehicle, comprising:

a decelerometer operable to produce a signal $d_v$ representative of the deceleration of said vehicle;

a clock pulse generator operable to produce a clock pulse signal $F_c$;

a wheel speed detector arrangement comprising two wheel speed sensors operable to produce respective signals representative of the instantaneous speeds of said two wheels of said axle and a first comparator which is operable to compare said signals from said wheel speed sensors and produce a signal $F_i$ representative of the instantaneous speed of the slower wheel of said axle;

a counter;

means feeding to said counter said signal $F_c$ from said clock pulse generator and said signal $F_i$ from said first comparator, said counter operating to count said clock pulses synchronised by said signal $F_i$ to produce an output signal $N_1$ given by:

$$N_1 = F_c T_1$$

where $T_1$ is a signal proportional to the inverse of the signal $F_i$ representing the speed of the slower wheel of the axle at the initial moment of the counting cycle; the counter also counting said clock pulses $F_c$ for a predetermined time T, after which it clears, the said counting being repeated cyclically;

a first memory circuit;

means feeding said first memory circuit with said output signal $N_1$ from said counter and with said signal $F_i$ from said first comparator, said first memory circuit being operable to store said output signal $N_1$ from said counter for the duration of the counting cycle;

a second, read only, memory circuit controlled by said first memory circuit and by said signal $d_v$ from said decelerometer, said second memory circuit being operable to produce an output signal of the form:

$$M = [1 - B - (A + C d_v) N_1/F_c] K$$

where A, B C and K are predetermined constants;

a multiplier circuit connected to the output of said second memory circuit and operable to multiply said output signal M from said second memory circuit by the factor $$F_c \frac{1}{K}$$

thus generating an output signal:

$$F_m = \frac{M F_c}{K};$$

a divider circuit connected to the output from said second memory circuit and to the output of said first memory circuit and operable to divide the output signal $F_m$ from said multiplier by said signal $N_1$ stored in said first memory thus generating a reference signal:

$$F_0 = \frac{M}{K T_1};$$

a second comparator connected to the output of said divider circuit and to the output of said first comparator and operating to compare during successive intervals of time T, the reference signal $F_0$ from said divider and said output signal $F_i$ from said first comparator representing the instantaneous speed of the slower wheel of said axle; said comparator being connected to a brake release device of the two wheels of the axle and operating to actuate said brake release device if the value of the signal $F_i$ representing the instantaneous speed of the slower wheel of said axle falls below the value of said reference signal $F_0$, means for generating a second reference signal $F_o^*$ which has an initial value dependent on the value of the speed of the vehicle at the moment when the brakes are released and which decreases linearly with a slope proportional to the deceleration of said vehicle at the moment when said brakes are released, and means feeding said second reference signal to said comparator to control reapplication of the brakes when said second reference signal $F_o^*$ becomes equal to or less than said signal $F_i$ from said first comparator representing the instantaneous speed of the slower wheel of said axle.

* * * * *